(12) United States Patent
La Fratta et al.

(10) Patent No.: US 11,016,885 B2
(45) Date of Patent: May 25, 2021

(54) MEMORY SUB-SYSTEM FOR DECODING NON-POWER-OF-TWO ADDRESSABLE UNIT ADDRESS BOUNDARIES

(71) Applicant: Micron Technology, Inc., Boise, ID (US)

(72) Inventors: Patrick A. La Fratta, McKinney, TX (US); Robert Walker, Raleigh, NC (US); Chandrasekhar Nagarajan, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/285,909

(22) Filed: Feb. 26, 2019

(65) Prior Publication Data
US 2020/0272562 A1 Aug. 27, 2020

(51) Int. Cl.
| | |
|---|---|
| *G06F 13/00* | (2006.01) |
| *G06F 13/28* | (2006.01) |
| *G06F 12/06* | (2006.01) |
| *G06F 12/04* | (2006.01) |
| *G06F 9/30* | (2018.01) |

(52) U.S. Cl.
CPC ......... *G06F 12/0607* (2013.01); *G06F 12/04* (2013.01); *G06F 9/30134* (2013.01)

(58) Field of Classification Search
CPC combination set(s) only.
See application file for complete search history.

(56) References Cited

U.S. PATENT DOCUMENTS 5,359,717 A * 10/1994 Bowles ............... G06F 13/4213
365/189.02

OTHER PUBLICATIONS

Qureshi, Moinuddin K, et al., "Fundamental Latency Trade-offs in Architecting DRAM Caches", 2012 IEEE/ACM 45th Annual International Symposium on Microarchltecture, (2012), 12 pgs.

\* cited by examiner

*Primary Examiner* — Yong J Choe
(74) *Attorney, Agent, or Firm* — Schwegman Lundberg & Woessner, P.A.

(57) ABSTRACT

A system generating, using a first addressable unit address decoder, a first addressable unit address based on an input address, an interleaving factor, and a number of first addressable units. The system then generating, using an internal address decoder, an internal address based on the input address, the interleaving factor, and the number of first addressable units. Generating the internal address includes: determining a lower address value by extracting lower bits of the internal address, determining an upper address value by extracting upper bits of the internal address, and adding the lower address value to the upper address value to generate the internal address. Using an internal power-of-two address boundary decoder and the internal address, the system then generating a second addressable unit address, a third addressable unit address, a fourth addressable unit address, and a fifth addressable unit address.

20 Claims, 6 Drawing Sheets

MEMORY SUB-SYSTEM FOR DECODING NON-POWER-OF-TWO ADDRESSABLE UNIT ADDRESS BOUNDARIES

TECHNICAL FIELD

Embodiments of the disclosure relate generally to memory sub-systems, and more specifically, relate to decoding non-power-of-two addressable unit address boundaries.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to decoding non-power-of-two addressable unit address boundaries. A memory sub-system is also hereinafter referred to as a "memory device". An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Figure 2:
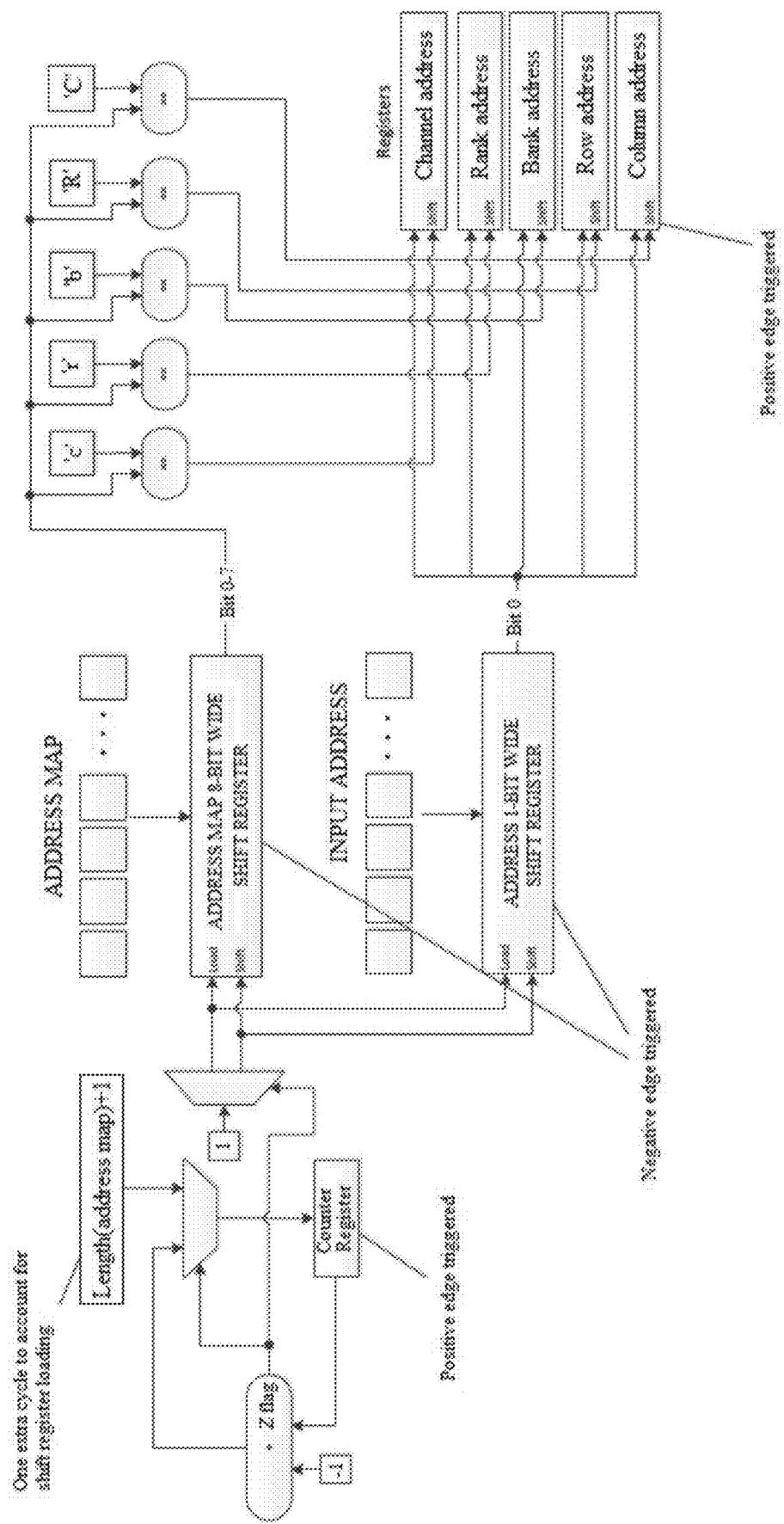
FIG. 2 is a logic diagram of a conventional address decoder that allows for power-of-two addressable unit address boundaries.

The address imp of a conventional address decoder can be configured through a bit map, which allows the specification of address boundaries at values that are powers-of-two (e.g., $2^n$, where $n \geq 0$). In an address map, 'c' indicates the position of the channel bit, 'r' indicates the position of the rank address bit, 'b' indicates the position of a bank address bit, 'R' indicates the position of a row address bit, and 'C' indicates the position of a column address bit. For example, an address map of "rbRRCC" specifies that when incrementing sequentially through the addresses, four columns will be accessed before switching to the next row, four rows will be accessed before switching to the next bank, and two banks will be accessed before switching to the next rank. This addressing is sufficient for applications that access data in power-of-two units. In FIG. 2, a logic diagram of a conventional decoder that allows powers-of-two address boundaries is illustrated. While the conventional decoder allows for powers-of-two address boundaries, the bit map and the conventional decoder in FIG. 2 cannot allow specifying a non-power-of-two address boundary in the address map.

There are cases in which allowing non-power-of-two address boundaries can offer performance benefits. For example, accessing 80 bytes of data from memory at a time across ranks or channels can improve concurrency of accesses in a multi-rank or multi-channel system. To enable such interleaving requires a design of an address decoder for the memory sub-system that allows specifying a non-power-of-two address boundary in the address map. The user of the conventional bit map and address decoder (e.g., in FIG. 2) is insufficient for these purposes.

Aspects of the present disclosure address the above and other deficiencies by having a memory sub-system that includes an address decoder that supports non-power-of-two addressable unit address boundaries. For example, the address decoder can support non-power-of-two addressable unit address boundary including a channel address, a rank address, a bank address, a row address or a column address.

Figure 1:
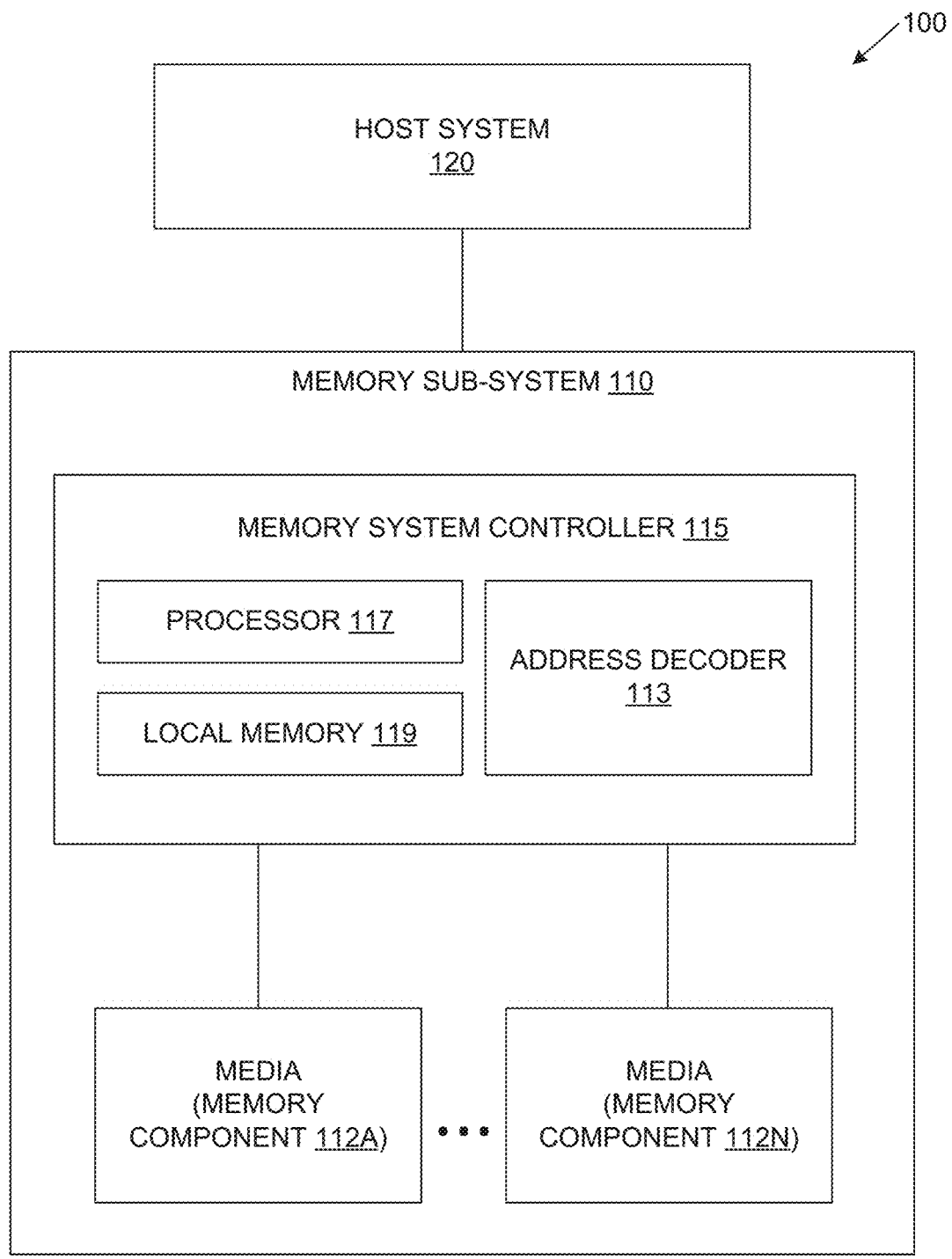
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM) synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes an address decoder 113 that can be used to support non-power-of-two addressable unit address boundaries. In some embodiments, the controller 115 includes at least a portion of the address decoder 113. For example, the controller 115 can include a processor 117 (processing device) configured to execute instructions stored in local memory 119 for performing the operations described herein. In some embodiments, the address decoder 113 is part of the host system 120, an application, or an operating system.

The address decoder 113 can support a non-power-of-two addressable unit address boundary can be any one of: the channel address boundary, the rank address boundary, the bank address boundary, the row address boundary, or the column address boundary. To support non-power-of-two addressable unit boundaries, the address decoder 113 is configured to receive an address map that is specified in two values. In the example where the non-power-of-two addressable unit address boundary is a channel address boundary, the address decoder 113 receives, as a first value of the address map, an interleaving factor that specifies the number of bytes between each channel boundary and, as a second value, a bit map that is expressed as a character string specifying the bit positions of the address bits other than the channel address bits. Specifically, the bit map is specifying the bit positions of the rank address bits, the bank address bits, the row address bits, and the column address bits. In this example, the address decoder 113 receives the interleaving factor, the number of channels, the input address which is the address being decoded. The address decoder 113 can generate a channel address and an internal address based on the interleaving factor, the number of channels, the input address. The address decoder 113 can also include an internal power-of-two address decoder that receives, as an address map, the bit map specifying the bit positions of the address bits other than the channel address bits. The address decoder 113 uses the internal power-of-two address decoder to generate the rank address, bank address, row address, and column address in this example. Further details with regards to the operations of the address decoder 113 are described below.

Figure 3:
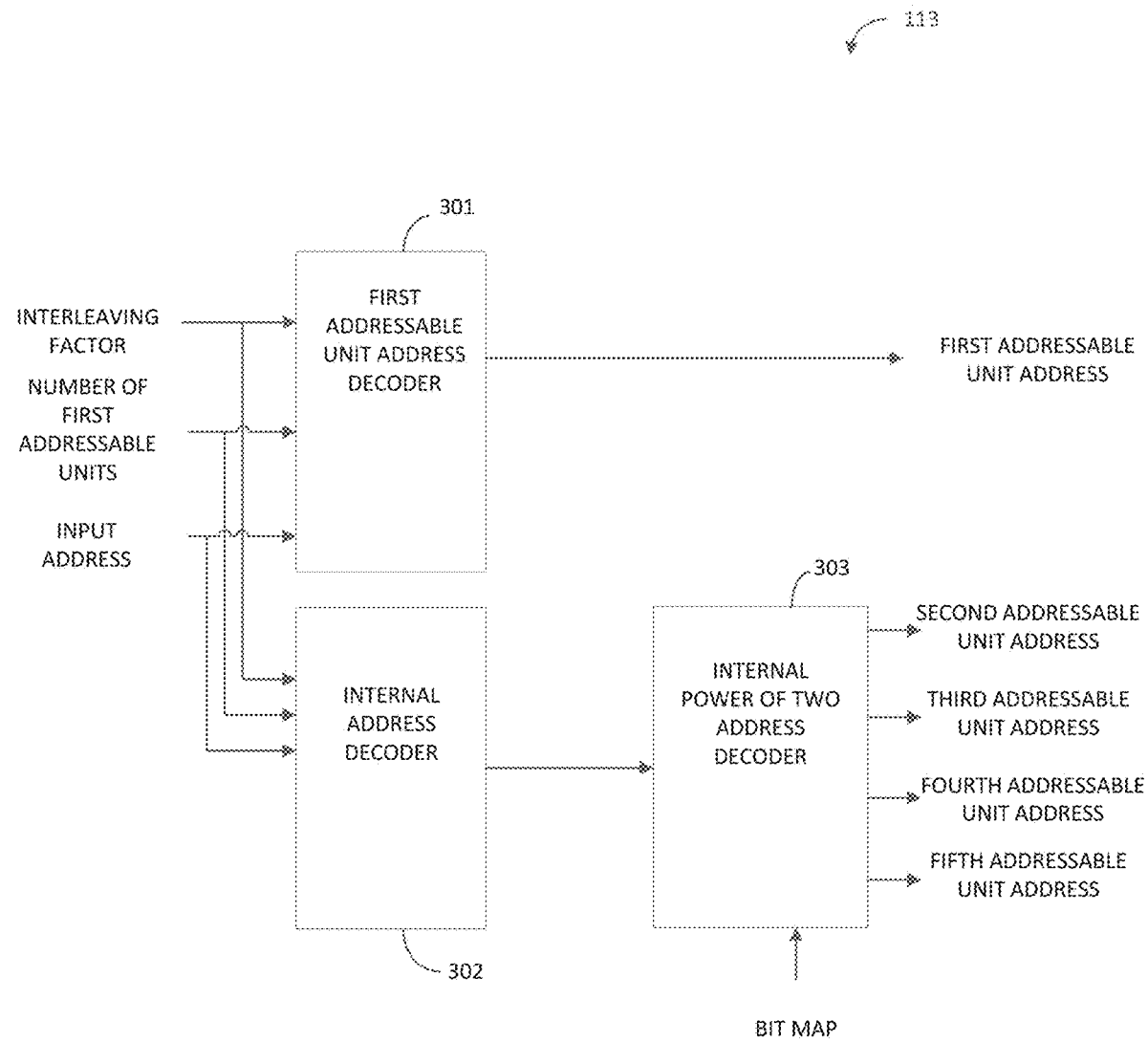
FIG. 3 is a block diagram of the details of the address decoder in accordance with some embodiments of the present disclosure.

FIG. 3 is a block diagram of the details of the address decoder 113 in accordance with some embodiments of the present disclosure. In FIG. 3, the address decoder 113 supports a non-power-of-two addressable unit address boundary. The addressable unit addresses include, for example, a channel address, a rank address, a bank address, a row address, and a column address. it is understood that the address decoder 113 can allow for the specification of a non-power-of-two addressable unit boundary being any one of: a channel address boundary, a rank address boundary, a bank address boundary, a row address boundary, or a column address boundary. Referring to FIG. 3, the first addressable unit address is associated with the non-power-of-two addressable unit boundary. For example, when the address decoder 113 decodes a non-power-of-two channel address boundary, the first addressable unit address is a channel address and the number of first addressable units is the number of channels in the memory sub-system. In this example, the second, the third, the fourth, and the fifth addressable unit addresses are, respectively, the rank address, the bank address, the row address, and the column address.

In FIG. 3, the address decoder 113 includes a first addressable unit address decoder 301, an internal address decoder 302 and an internal power-of-two address decoder 303. In this example, the first addressable unit address decoder 301 generates a channel address while the internal power-of-two address decoder 303 generates the rank address, the bank address, the row address, and the column address.

The first addressable unit address decoder 301 receives as inputs an interleaving factor, a number of addressable units and an input address that is the address that is being decoded by the address decoder 113. In this example, the interleaving factor specifies the number of bytes between each channel boundary and the number addressable units is the number of channels in the memory sub-system 110. To generate the first addressable unit address, the first addressable unit address decoder 301 divides the input address by the interleaving factor to generate a first value and performs a modulo operation between the first value and the number of first addressable units. For example, the first addressable unit address decoder 301 can perform a modulo operation between the first value and the number of channels to generate the channel address. The first addressable unit address decoder 301 may perform the operations of the equation as follows:

$$\text{channel address} = \left(\frac{addr}{IF}\right) \% \ num\_chan$$

In this equation, addr is the input address, IF is the interleaving factor, and nu chart is the number of channels. In this embodiment, the operations of the equations are integer operations, so the division operations are rounded down to the nearest integer value.

In one example, an interleaving factor is 80 bytes. The first addressable unit address decoder 301 will have the effect that when incrementing through the address space sequentially, the channel address will be incremented every 80 bytes. When the last channel is reached, the modulo operation will have the effect of wrapping the channel index hack to 0. For example, if the number of channels is 4, address 0 will have the channel address of 0 (e.g., =(0/80) % 4), address 160 will have a channel address of 2 (e.g., (160/80) % 4), and address 80 will have a channel address of 1 (e.g., (80/80) % 4). The cycling through of the channels every 80 bytes repeats through the address space, which effects the desired 80-byte channel interleaving.

The internal address decoder 302 receives as inputs the interleaving factor, number of addressable units and the input address and generates the internal address by extracting a lower address value that includes the lower bits of the internal address, extracting an upper address value that includes the upper bits of the internal address and adding the lower address value and the upper address value. In this example, the internal address is the address within the channel. For example, the internal address decoder 302 may perform the operations of the equation as follows:

$$\text{internal address} = (addr \ \% \ IF) + \left[\frac{addr}{(IF * num\_chan)}\right] * IF$$

In this equation, addr is the input address, IF is the interleaving factor, and num_chan is the number of channels. In this embodiment, the operations of the equations are integer operations, so the division operations are rounded down to the nearest integer value.

First, to extract the lower address value, the internal address decoder 302 performs a modulo operation between the input address and the interleaving factor to generate the lower address value. For example, an input address that falls on the channel boundary will have a lower address value of 0. When the input address is in bytes from the channel boundary, then the lower address value is m. For example, an input address of 325 will have a lower address value of 5, and an input address of 852 will have a lower address value of 52.

Second, to extract the upper address value, the internal address decoder 302 multiplies the interleaving factor by the number of addressable units (e.g., number of channels) to obtain a first value, divides the input address by the first value to obtain a second value, and multiplies the second value by the interleaving factor to generate the upper address value. For example, with an interleaving factor of 80 and a number of channels of 4, an input address of 325 has an upper address value of 80 (e.g., [325/(80*4)]*80). In this example, the input address of 852 has an upper address value of 160 (e.g., [852/(80*4)]*80).

Third, the internal address decoder 302 adds the upper address value and the lower address value to generate the internal address. For example, for the input address of 325, the internal address is 85 (e.g., 5+80) and for the input address of 852, the internal address is 212 (e.g., 52+160).

The internal power-of-two address boundary decoder 303 receives the internal address from the internal address decoder 302. The internal power-of-two address boundary decoder 303 is configured with a bit map that specifies the locations of the address bits other than the first addressable unit address bit. For example, when the first addressable unit address is the channel address as illustrated in FIG. 3, the internal power-of-two address boundary decoder 303 is configured with a bit map that specifies the location of bit positions of the rank address, the bank address, the row address and the column address. In one embodiment, the internal power-of-two address boundary decoder 303 receives the bit map as a character string of bit positions of the rank address, the bank address, the row address and the column address. The internal power-of-two address boundary decoder 303 decodes the internal address using the bit map to generate the addressable unit addresses other than the first addressable unit address. For example, in FIG. 3, the first addressable unit address is the channel address such that the internal power-of-two address boundary decoder 303 generates the rank address, the bank address, the row address and the column address. In some embodiments, the channel address generated by the first addressable unit address decoder 301, and the rank address, the bank address, the row address and the column address from the internal power-of-two address boundary decoder 303 are stored in registers, respectively.

Figure 4:
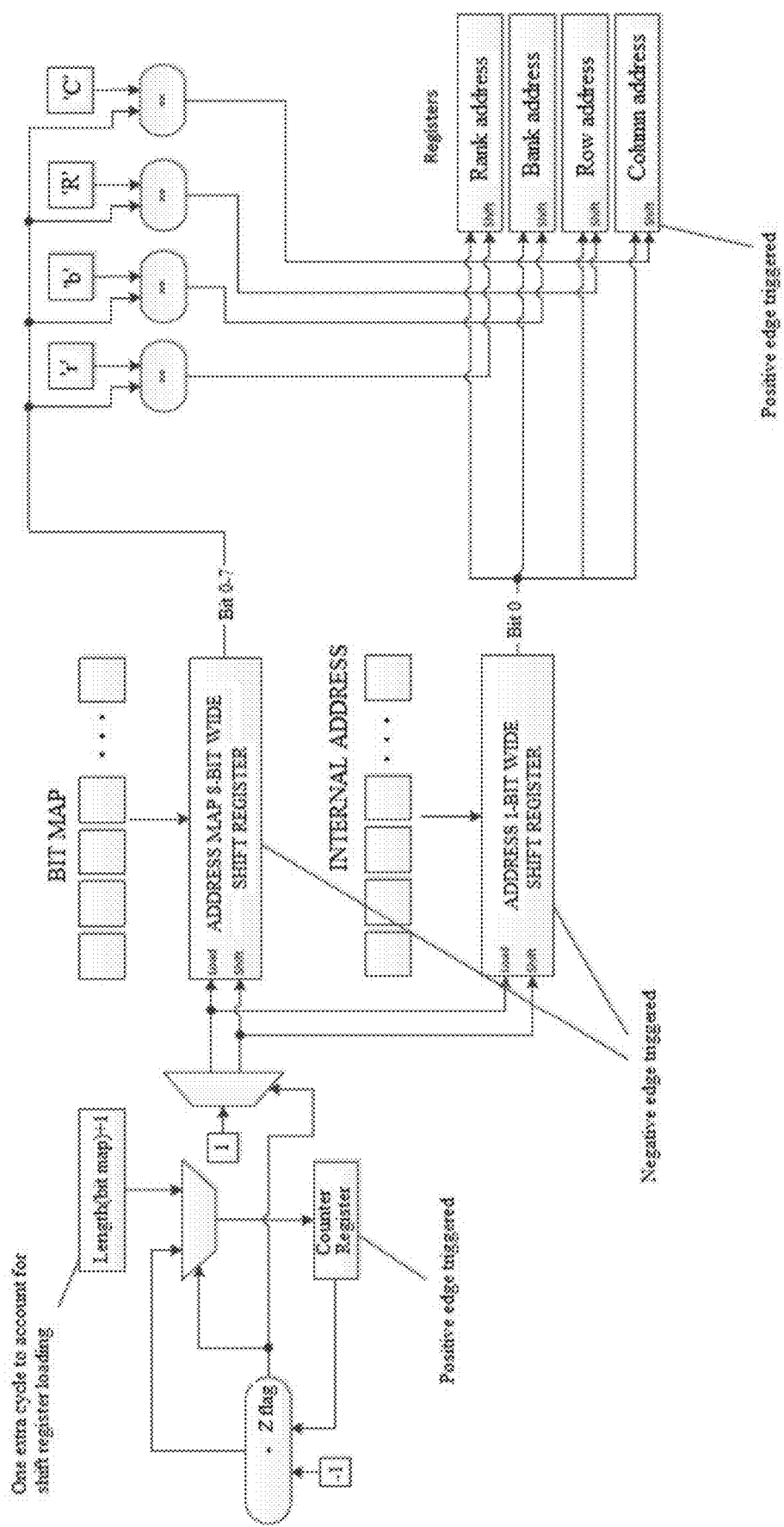
FIG. 4 is a logic diagram of the details of the internal power-of-two address decoder 303 in FIG. 3 of address decoder in accordance with some embodiments of the present disclosure.

FIG. 4 is a logic diagram of the details of the internal power-of-two address decoder 303 in FIG. 3 of address decoder in accordance with some embodiments of the present disclosure. In this example, the first addressable unit address is the channel address such that the internal power-of-two address decoder 303 decodes the rank address, the bank address, the row address and the column address. The internal power-of-two address decoder 303 receives the bit map that specifies the location of bit positions of the rank address, the bank address, the row address and the column address and the internal address to generate the rank address, the bank address, the r address and the column address.

Figure 5:
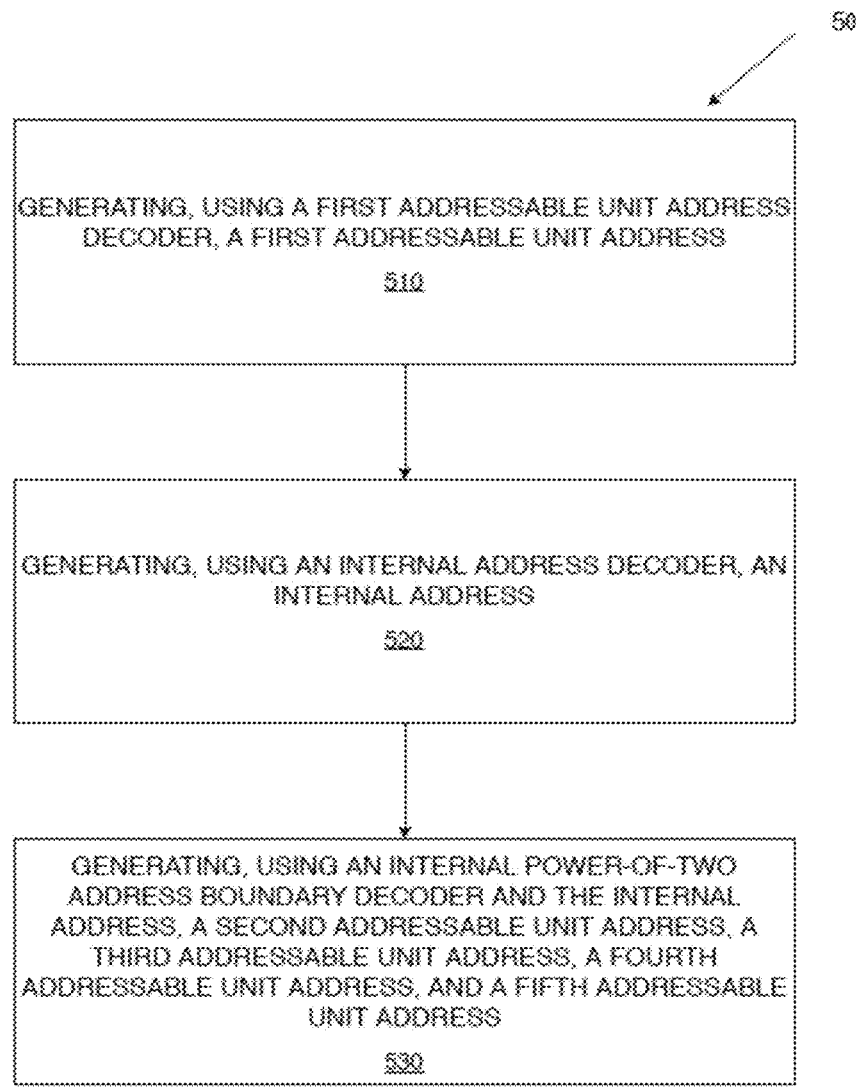
FIG. 5 is a flow diagram of an example method to decode non-power-of-two addressable unit address boundaries in accordance with some embodiments of the present disclosure.

FIG. 5 is a flow diagram of an example method 500 to decode non-power-of-two addressable unit address boundaries in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the address decoder 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing device generates, using a first addressable unit address decoder, a first addressable unit address based on an input address, an interleaving factor, and a number of first addressable units. The first addressable unit address is one of: a channel address, a rank address, a bank address, a row address or a column address. The processing device can generate the first addressable unit address by dividing the input address by the interleaving factor to generate a first value and by performing a modulo operation between the first value and the number of first addressable units to generate the first addressable unit address. In one embodiment, the first addressable unit address is a channel address such that the processing device divides the input address by the interleaving factor to generate a first value and performs a modulo operation between the first value and the number of channels to generate the channel address.

At operation 520, the processing device generates, using an internal address decoder, an internal address based on the input address, the interleaving factor, and the number of first addressable units. To generate the internal address, first, the processing device determines a lower address value by extracting lower bits of the internal address. The processing device performs a modulo operation between the input address and the interleaving factor to generate the lower address value. The lower address value is a number of bytes the input address is from a channel boundary when the first addressable unit address is a channel address. Second, the processing device determines an upper address value by extracting upper bits of the internal address. The processing device multiplies the interleaving factor by the number of first addressable units (e.g., the number of channels) to obtain a first value, divides the input address by the first value to obtain a second value, and multiplies the second value by the interleaving factor to generate the upper address value. Third, the processing device adds the lower address value to the upper address value to generate the internal address.

At operation 530, the processing device generates, using an internal power-of-two address boundary decoder and the internal address, a second addressable unit address, a third addressable unit address, a fourth addressable unit address, and a fifth addressable unit address. When the first addressable unit address is a channel address, the second addressable unit address, the third addressable unit address, the fourth addressable unit address, and the fifth addressable unit address are, respectively, a rank address, a bank address, a row address and a column address. In this embodiment, the internal power-of-two address boundary decoder is configured with a bit map received as a character string of bit positions of the rank address, the bank address, the row address and the column address.

Figure 6:
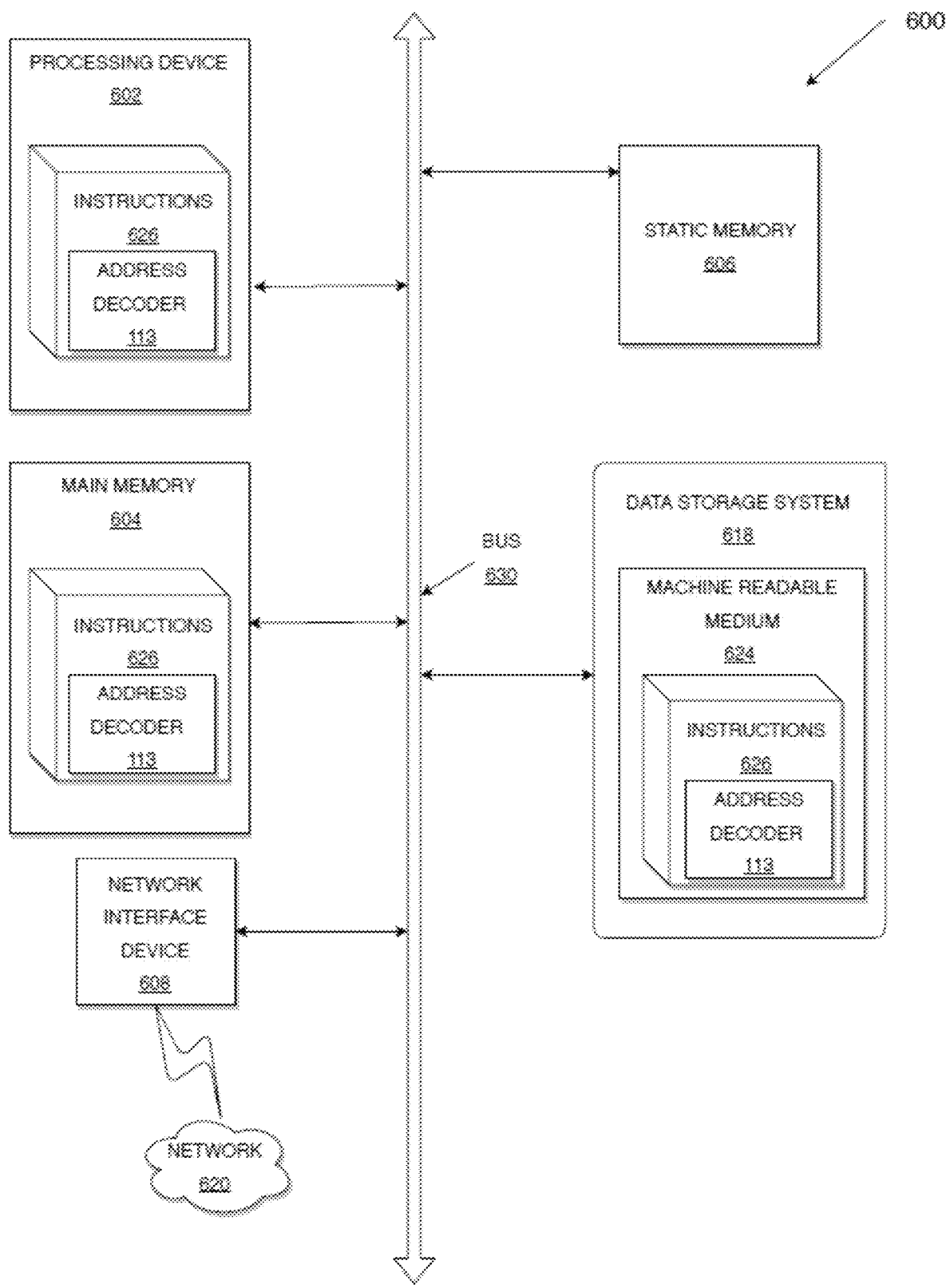
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the address decoder 113 of FIG. 1 that supports non-power-of-two addressable unit address boundaries). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or, jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an address decoder (e.g., the address decoder 113 of FIG. 1 that supports non-power-of-two addressable unit address boundaries). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for perform g the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory component; and a processing device operatively coupled with the memory component, the processing device configured to perform operations comprising:
generating, using a first addressable unit address decoder, a first addressable unit address based on an input address, an interleaving factor, and a number of first addressable units;
generating, using an internal address decoder, an internal address based on the input address, the interleaving factor, and the number of first addressable units, wherein generating the internal address comprising:
determining a lower address value by extracting lower bits of the internal address,
determining an upper address value by extracting upper bits of the internal address, and
adding the lower address value to the upper address value to generate the internal address; and
generating, using an internal power-of-two address boundary decoder and the internal address, a second addressable unit address, a third addressable unit address, a fourth addressable unit address, and a fifth addressable unit address, wherein the power-of-two is $2^n$, wherein n is greater or equal to 0.

2. The system of claim 1, wherein the first addressable unit address is one of: a channel address, a rank address, a bank address, a row address or a column address.

3. The system of claim 1,
wherein the first addressable unit address decoder is a channel address decoder, the first addressable unit address is a channel address, the number of first addressable units is a number of channels, and
wherein the second addressable unit address, the third addressable unit address, the fourth addressable unit address, and the fifth addressable unit address are, respectively, a rank address, a bank address, a row address and a column address.

4. The system of claim 3, wherein the interleaving factor is a value that specifies a number of bytes between each channel boundary.

5. The system of claim 3, wherein the internal power-of-two address boundary decoder is configured with a bit map received as a character string of bit positions of the rank address, the bank address, the row address and the column address.

6. The system of claim 3, wherein generating, using the channel address decoder, the channel address includes:
dividing the input address by the interleaving factor to generate a first value, and
performing a modulo operation between the first value and the number of channels to generate the channel address.

7. The system of claim 3, wherein determining, using the internal address decoder, the lower address value includes:
performing a modulo operation between the input address and the interleaving factor to generate the lower address value.

8. The system of claim 3, wherein the lower address value is a number of bytes the input address is from a channel boundary.

9. The system of claim 3, wherein determining, using the internal address decoder, the upper address value includes:
multiplying the interleaving factor by the number of channels to obtain a first value,
dividing the input address by the first value to obtain a second value, and
multiplying the second value by the interleaving factor to generate the upper address value.

10. A method comprising:
generating, using a first addressable unit address decoder, a first addressable unit address based on an input address, an interleaving factor, and a number of first addressable units;
generating, using an internal address decoder, an internal address based on the input address, the interleaving factor, and the number of first addressable units, wherein generating the internal address comprises:
determining a lower address value by extracting lower bits of the internal address,
determining an upper address value by extracting upper bits of the internal address, and
adding the lower address value to the upper address value to generate the internal address; and
generating, using an internal power-of-two address boundary decoder and the internal address, a second addressable unit address, a third addressable unit address, a fourth addressable unit address, and a fifth addressable unit address, wherein the power-of-two is $2^n$, wherein n is greater or equal to 0.

11. The method of claim 10, wherein the first addressable unit address is one of: a channel address, a rank address, a bank address, a row address or a column address.

12. The method of claim 10,
wherein the first addressable unit address decoder is a channel address decoder, the first addressable unit address is a channel address, the number of first addressable units is a number of channels, and
wherein the second addressable unit address, the third addressable unit address, the fourth addressable unit address, and the fifth addressable unit address are, respectively, a rank address, a bank address, a row address and a column address.

13. The method of claim 12, wherein the interleaving factor is a value that specifies a number of bytes between each channel boundary.

14. The method of claim 12, wherein the internal power-of-two address boundary decoder is configured with a bit map received as a character string of bit positions of the rank address, the bank address, the row address and the column address.

15. The method of claim 12, wherein generating, using the channel address decoder, the channel address includes:
dividing the input address by the interleaving factor to generate a first value, and
performing a modulo operation between the first value and the number of channels to generate the channel address.

16. The method of claim 12, wherein determining, using the internal address decoder, the lower address value includes:
performing a modulo operation between the input address and the interleaving factor to generate the lower address value.

17. The method of claim 12, wherein the lower address value is a number of bytes the input address is from a channel boundary.

18. The method of claim 12, wherein determining, using the internal address decoder, the upper address value includes:
multiplying the interleaving factor by the number of channels to obtain a first value,
dividing the input address by the first value to obtain a second value, and
multiplying the second value by the interleaving factor to generate the upper address value.

19. At least one non-transitory machine-readable storage medium comprising instructions that, when executed by a processing device, cause the processing device to perform operations comprising:
  generating, using a channel address decoder, a channel address based on an input address, an interleaving factor, and a number of first channels;
  generating, using an internal address decoder, an internal address based on the input address, the interleaving factor, and the number of channels, wherein generating the internal address comprises:
    determining a lower address value by extracting lower bits of the internal address, determining an upper address value by extracting upper bits of the internal address, and
    adding the lower address value to the upper address value to generate the internal address; and
  generating, using a power-of-two address boundary decoder and the internal address, a rank address, a bank address, a row address and a column address, wherein the power-of-two is $2^n$, wherein n is greater or equal to 0.

20. The at least one non-transitory machine-readable storage medium of claim 19,
  wherein generating, using the channel address decoder, the channel address includes:
    dividing the input address by the interleaving factor to generate a first value, and
    performing a modulo operation between the first value and the number of channels to generate the channel address;
  wherein determining, using the internal address decoder, the lower address value includes:
    performing a modulo operation between the input address and the interleaving factor to generate the lower address value; and
  wherein determining, using the internal address decoder, the upper address value includes:
    multiplying the interleaving factor by the number of channels to obtain a first value,
    dividing the input address by the first value to obtain a second value, and
    multiplying the second value by the interleaving factor to generate the upper address value.

* * * * *